Nov. 18, 1930.     M. MASON     1,782,045
THERMOSTAT AND SIMILAR CONTROL MECHANISM
Filed April 20, 1926     3 Sheets-Sheet 1
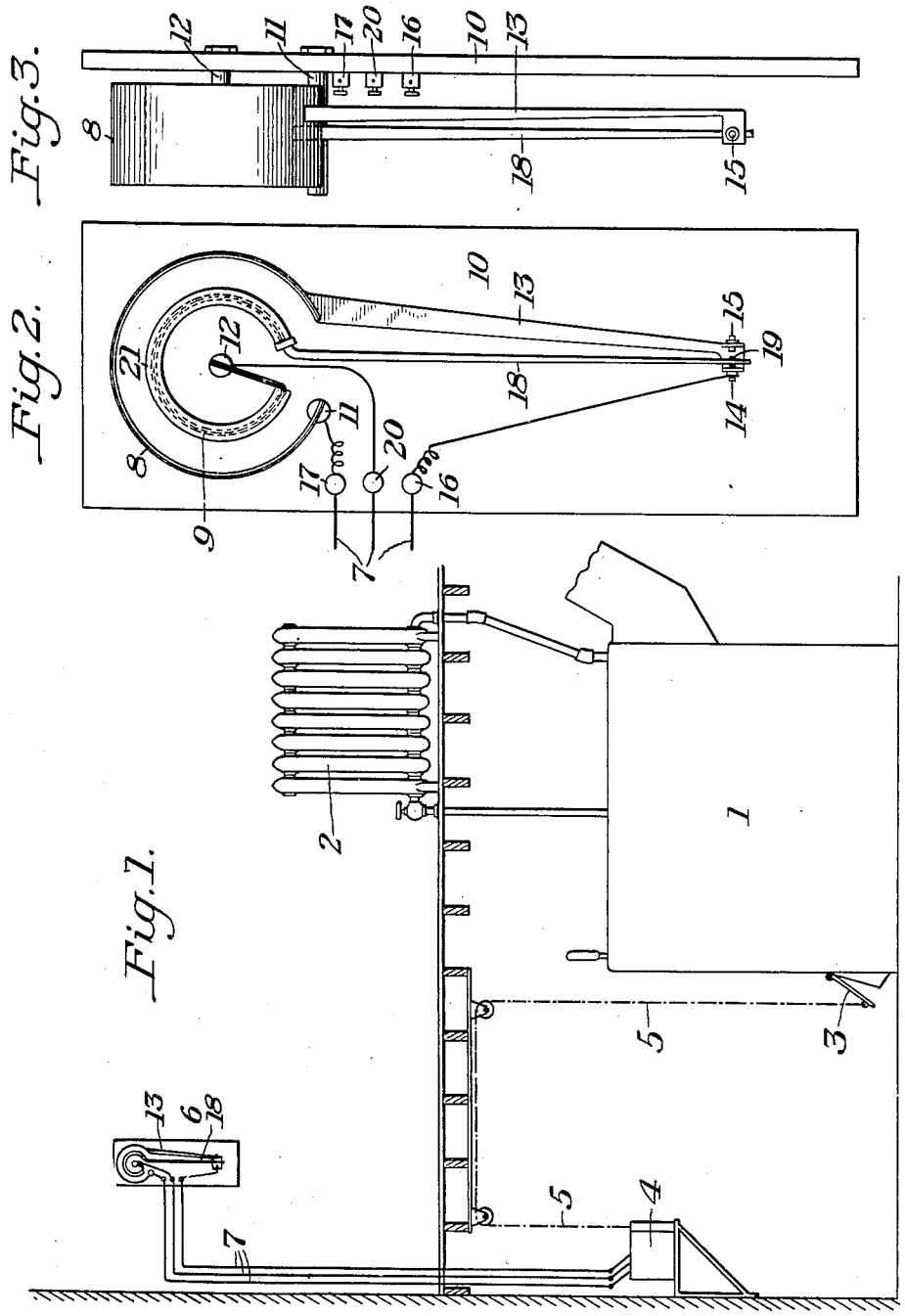
INVENTOR
Max Mason
by his attorney
Byrnes, Stebbins & Parmelee

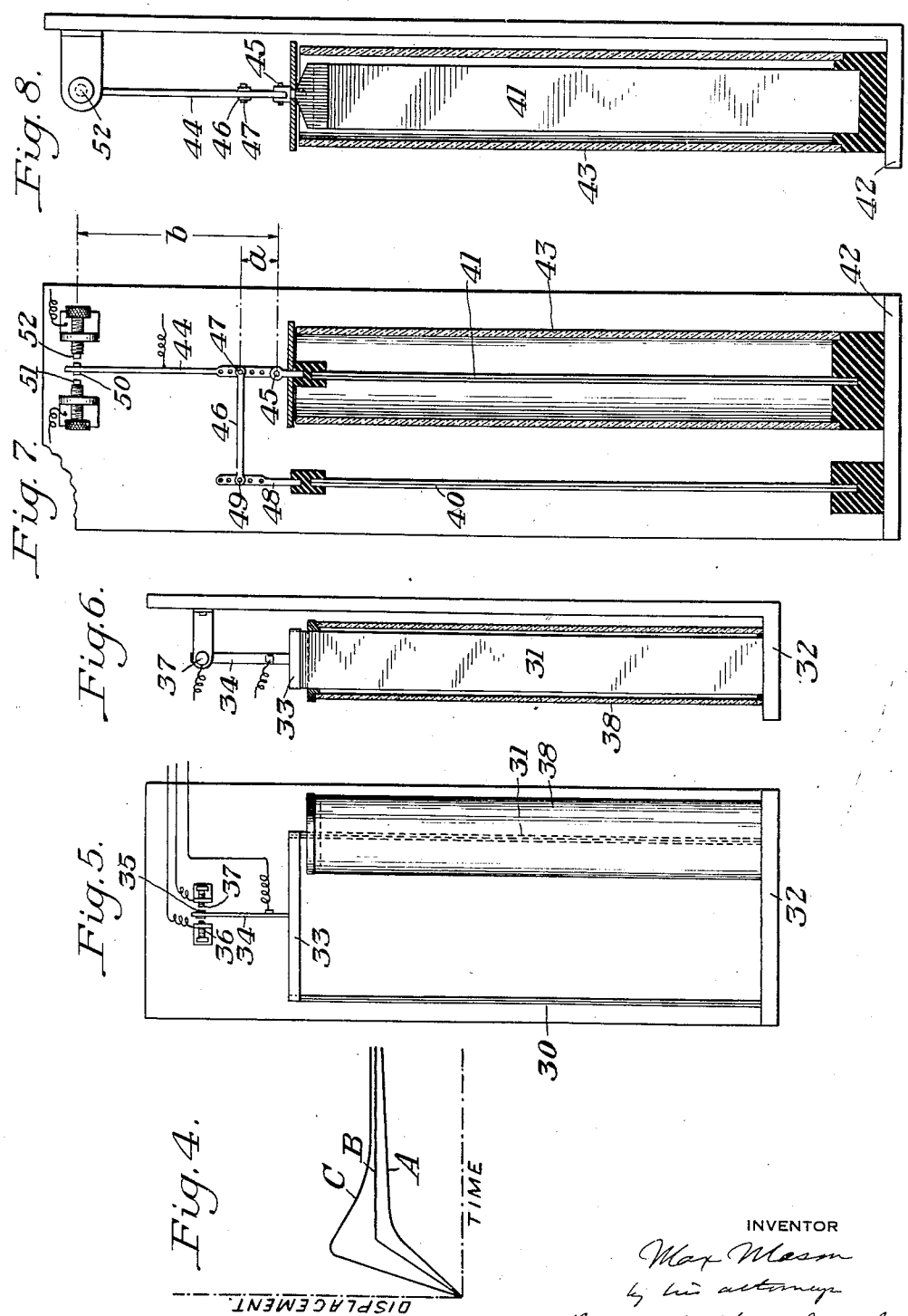

Nov. 18, 1930.  M. MASON  1,782,045
THERMOSTAT AND SIMILAR CONTROL MECHANISM
Filed April 20, 1926  3 Sheets-Sheet 3

INVENTOR
Max Mason
by his attorneys
Byrnes, Stebbins & Parmelee

Patented Nov. 18, 1930

1,782,045

UNITED STATES PATENT OFFICE

MAX MASON, OF CHICAGO, ILLINOIS, ASSIGNOR OF THIRTY PER CENT TO LOUIS B. SLICHTER, THIRTY PER CENT TO DONALD L. HAY, AND TEN PER CENT TO DONALD C. SLICHTER, ALL OF MADISON, WISCONSIN

THERMOSTAT AND SIMILAR CONTROL MECHANISM

Application filed April 20, 1926. Serial No. 103,394.

The present invention relates to thermostats and similar control mechanisms, such for example, as pressure regulators, flow regulators, speed governors, and the like, which are used to maintain constancy of some condition under variable external conditions or demands.

A complete control mechanism of this character customarily performs two functions. One function is the measurement of the variations in the condition to be controlled and the other function is the alteration of the supply of the agent which produces the condition to be controlled. Thus, most control mechanisms may be regarded as composed of a sensitive part or element which acts as a measuring device for the condition to be controlled, and a part which acts as a motor to change the source conditions which produce the controlled state.

Referring more specifically to thermostatic control, the complete control mechanism comprises a thermostat and means controlled by the thermostat for regulating the heat supply. The thermostat itself usually comprises a thermoresponsive element such as a bimetallic strip which deflects when subjected to temperature changes, a vapor pressure thermostat element, or a thermocouple whose electromotive force is dependent on temperature. In all these cases the sensitive element acts as a thermometer or measurer of temperature. Other parts of the control device function to adjust the heat supply in accordance with the deflection of the bimetallic strip or temperature condition of the thermoresponsive sensitive element. For example, the sensitive bimetallic strip may make or break electric circuits which in turn control through suitable axiliary motors, the position of the drafts of a furnace.

In the usual thermostatic furnace governors there is a tendency to oscillate or hunt about an equilibrium condition, due to a time lag between the change in the room temperature to which the thermostat is subjected and the compensating action of the control mechanism. For example, take the case of a steam boiler or other building heater controlled by an ordinary thermostat. The thermostat itself usually has a time lag due to the fact that the time required for the sensitive thermostat element to reach the temperature of the room atmosphere to within say one degree may be of the order of one-half hour or so for sudden changes in temperature. This time lag in the response of the thermostat tends to allow the temperature to rise considerably above or fall considerably below that desired before shutting off or throttling the heat supply or closing the furnace drafts. In addition to this, the heater continues to supply heat for some time after it is shut off or regulated to a lower rate of combustion, due to its heat capacity, so that even if there were no time lag in the action of the thermostat, the temperature would still go beyond the desired value.

The tendency for the temperature to go past the desired value is greater for rapid temperature variations than for slow temperature variations. I overcome these defects in the usual thermostatic control by employing a thermostat which has a greater response to rapid temperature variations than to slow temperature variations, or in other words, which has a tendency to over compensate in the case of rapid temperature variations. A single instance of the action of my type of thermostat would be sufficient to show this action. Suppose that the room temperature has fallen below that for which the thermostat is set and that the drafts on the heater are opened to start up the fire. If the fire starts up rapidly, the desired rate of combustion will be exceeded before the ordinary room thermostat has responded to the temperature increase in the room atmosphere. However, by making the thermostat have a more pronounced action for a sudden change in the temperature, the drafts may be closed before the temperature in the room has reached the desired point, and due to the heat capacity of the furnace and the tendency of the fire to continue hot after the drafts are closed, the correct room temperature will be attained but not exceeded after the thermostat has closed the drafts. As a specific example, assume that the thermostat is set to maintain a room temperature of 100

70° F., and assume that the temperature has dropped to 60° F. and that the thermostat has acted to open the furnace drafts. In the case of the ordinary thermostat it would not act to close the drafts until the room temperature had increased at 70°. However, by making the thermostat in the room have a greater response to a rapid temperature change than to a slow temperature change, the thermostat may act to close the furnace drafts at, say 65° room temperature, if the fire is coming up rapidly and thus prevent overheating of the room which would occur if the drafts were not closed until the room temperature had reached 70°.

In the case of a very slow increase of temperature, such for example, as the fire coming up very slowly, my thermostat will have the usual thermostatic action and will allow the room temperature to reach the desired point before shutting off the heat, since in the case of a very slow increase in the furnace fire or heat supply, there is not the tendency to overshoot or hunt that there is in the case of a rapidly increasing fire.

In the drawings which illustrate the preferred embodiment of my invention;

Figure 1 is a diagrammatic view showing the application of my thermostat to room temperature control;

Figures 2 and 3 are front and side elevational views, respectively, of the thermostat itself;

Figure 4 is a view illustrating graphically, the response of various types of thermostats;

Figures 5 and 6 are front and side elevations taken partly in section of a modified form of thermostat;

Figures 7 and 8 are front and side elevations, respectively, taken partly in section of still another modification.

Figure 9:
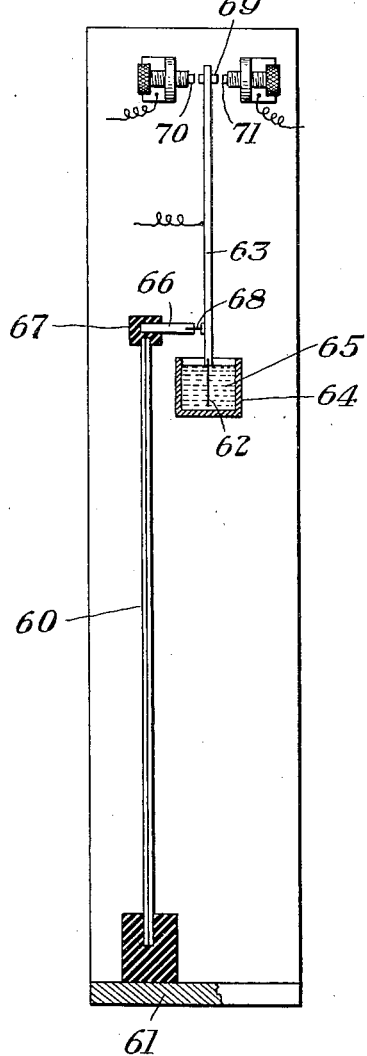
Figures 9 and 10 are front and side elevations, respectively, taken partly in section of still another modification.

Referring to the drawings which illustrate my invention as embodied in a thermostatic control; in Figure 1 is illustrated diagrammatically, a house heating plant and thermostatic control for the heater. The heater which is illustrated as a steam or hot water heater is indicated generally by reference numeral 1, the heat is supplied to the room in which the thermostat is located by means of the usual steam or hot water radiator 2. The heat supply is automatically regulated by the position of the furnace damper 3. A suitable motor such as a motor 4 which may be either an electric motor or a spring-driven mechanical motor opens and closes the draft 3 by means of a chain 5. The motor 4 is controlled by a thermostat 6 placed in the room heated by the radiator 2. The thermostat 6 has electric contacts which control the three-wire circuits 7 to cause the motor 4 to close or open the drafts in accordance with the action of the thermostat. The three-wire thermostatically controlled electric circuit and the damper operating motor are well known in this art and need not be described in detail.

The thermostat (Figs. 2 and 3) comprises two bimetallic elements 8 and 9 which are mounted on a base 10 by means of pins 11 and 12, respectively. The pin 12 may be turned in the base so that the element 9 may be adjusted to set the thermostat to maintain any desired temperature.

The bimetallic element 8 has a downwardly extending arm 13 which carries two insulated electrical contacts 14 and 15, which are connected with the binding posts 16 and 17, respectively. The bimetallic element 9 has a downwardly extending arm 18 having a contact 19 movable between the contacts 14 and 15 and electrically connected to the binding post 20. The binding posts 16, 17 and 20 are connected to the three-wires of the circuits 7 which control the damper operating motor 4. When the contact 19 is in contact with one of the other contacts, say the contact 15, the motor is operated to close the draft and when the contact 19 is in contact with the other contact 14 the motor is operated to open the draft. After the motor has operated to either open or close the draft, the motor automatically stops even though the thermostat contacts remain together, as is usual in motors for automatic thermostatic heater control The bimetallic element 8 has a greater sensitivity than the element 9, that is to say, the end of the contact bearing arm 13 of the element 8 has a greater displacement than the end of the contact bearing arm 18 of the element 9 for a given temperature change to which the bimetallic elements 8 and 9 may be subjected. The less sensitive bimetallic element 9 is surrounded by a heat insulating shield 21 so that the element 9 has a time lag behind the element 8 in its response to any temperature variation to which the thermostat is subjected. For very slow temperature variations, the heat insulation or lagging has little, if any, appreciable effect. However, for a rapid change in temperature, the heat insulation or lagging has a very decided effect and causes the response of the insulated element 9 to lag behind that of the bimetallic element 8 which is directly exposed to the surrounding air. As it may take a considerable time, depending upon the thickness of the heat insulation 21, for a change in temperature to communicate itself through the heat insulation to the bimetallic element 9, the bimetallic element 9 is responding to the temperature at a previous time whereas the bimetallic element 8 is responding to the temperature at the present time. For example, assume that the temperature has been 60° F. and the drafts on the furnace are opened and the fire is forced and the temperature starts to climb to the desired 70°. The thermostat 8 will respond immediately to the temperature of the air which surrounds it, whereas, the thermostat 9, because of the heat insulation, will, for a considerable time, be responsive to the previous temperature of 60°, and will not respond to the increased temperature until the heat has had sufficient time to permeate the insulation. It will be readily apparent, therefore, that for a rapid temperature change, the arm 13 of the exposed element 8 will move much more rapidly than the arm 18 of the lag element 9 and will make contact with the more slowly moving arm, thus cutting off or turning on the heat at a time prior to that of the ordinary single thermometer element thermostat. For example, assume that the room temperature has dropped to say 60° F. and that the contacts 14 and 19 have come together to operate the motor 4 in a direction to open the draft 3 and start the fire. Assume that the fire is forced rapidly and the temperature starts to rise rapidly, the thermostatic element 8 will respond rapidly, whereas, the thermostatic element 9 will be but little affected. The contact 14 will move away from the contact 19 and the contact 15 will make contact with contact 19 at some temperature, say 65° F., less than the desired 70° at which the thermostat is set to maintain the room temperature. Since the temperature is increasing rapidly, the heater will still continue to supply an increased heat after the damper is closed at 65° room temperature, and will bring up the room temperature to about 70° but without exceeding this point. If the room temperature remains at 70°, the lagged element 9 will gradually acquire this temperature and the arm 18 will be moved to bring the contact 19 into a neutral position between the contacts 14 and 15 so that the thermostat will be in condition to respond to a drop in temperature which will cause it to turn on the heat.

Thermostats are usually set to operate only when the temperature deviates from the desired temperature by a predetermined amount, say, 1° above or below 70° F. Assume that the thermostat is adjusted to be responsive to a variation of 1° above or 1° below 70° F. If the deviation of the temperature to 1° above or below 70° F. occurs slowly, my thermostat will act like the usual thermostat and will not make the contacts to operate the damper until the temperature of 71 or 69° respectively, is reached. On the other hand, if there is a sharp rise or fall of temperature from 70°, the thermostat will operate at a smaller deviation than 1°, due to the fact that the more sensitive unlagged element 8 will respond rapidly to a quick change in temperature, whereas the lagged element 9 will respond slowly so that the arm 13 will make contact more quickly with the arm 18 than would be the case if the temperature variation were slow and the elements 8 and 9 could, therefore, respond substantially simultaneously to the temperature variation.

Since the thermostatic element 9 is less sensitive, that is, the arm 18 has a lesser movement than the arm 13 for the same number of degrees of temperature effective on the bimetallic strips 9 and 8, arm 18 may be considered as relatively stationary with respect to the arm 13. In fact, for a very quick variation in temperature the arm 18 is substantially stationary, whereas the arm 13 responds with a relatively quick movement. After the temperature change has had a chance to permeate the heat insulation 21, the arm 18 will, of course move in response thereto. Since the arms 13 and 18 will move in the same direction for an increase or a decrease in temperature, the effect of the movement of the arm 18 is to tend to neutralize the effect of the arm 13. Due to the fact, however, that the thermostatic element 9 is insulated, the neutralizing effect of the element 9 on the element 8 will be smaller for quick variations in temperature than for slow variations and, therefore, as a result the action of the thermostat as a whole will have a more pronounced response to quick temperature variations than to slow temperature variations.

The character of the response of various types of thermostats is indicated diagrammatically by the curves in Figure 4. Assume that the temperature rises and remains constant as indicated by the curve B. This curve would also indicate the displacement of the control mechanism if there were no lag in the instrument. The curve A shows the response of the ordinary single element thermostat which will lag behind the temperature change. The curve C shows the action of a thermostat of the type herein described. By selecting the two thermostat elements of the proper relative sensitivities and by properly heat insulating one of the thermostat elements the thermostat as a whole may be made to give an over compensation such as that shown in the curve C, or, by changing these variables, the curve C may be made to coincide with the curve B, thus causing the thermostat to follow substantially exactly the room temperature. Due to the fact that practically all heat supply systems have their own heat capacity or lag, it is preferable to make the thermostat operate to overcompensate as shown graphically by the curve C.

In Figures 5 and 6 there is illustrated a modified form of thermostat which consists of two bimetallic strips 30 and 31 extending from a mounting base 32 and rigidly connected at their tops by a bar 33 which carries an arm 34 bearing a contact 35 movable between stationary contacts 36 and 37. The strips 30 and 31 are so mounted that their displacements would be in reverse directions, if they were free to deflect independently. The contacts 35, 36 and 37 may be connected to a three-wire electric control circuit such as that shown in Figure 1. The thermostat element 31 is surrounded by a heat insulating shield 38 so that its response has a time lag over the thermostatic element 30. The thermostatic element 31 opposes the thermostatic element 30 but is weaker so that it is overcome by the element 30. For slow temperature variations the stronger element 30 and the weaker element 31 operate in effect like a single thermostatic element to follow the variations and cause the contact 35 to move against the contacts 36 and 37 for predetermined deviations from the temperature for which the thermostat is set to maintain. However, the thermostat is more responsive to rapid variations of temperature than it is to slow variations. Assume that the thermostat has been subjected to a rapid increase in temperature. This will immediately affect the bimetallic strip 30 which will push over against the bimetallic strip 31 which because of its heat insulation, does not exert any immediate neutralizing action against the strip 30. This form of thermostat, like that shown in Figures 2 and 3, therefore, has a more pronounced action for rapid temperature variations.

Still another modification is shown in Figures 7 and 8 in which reference numerals 40 and 41 indicate bimetallic strips mounted on a base 42. The strip 40 is exposed directly to the surrounding atmosphere while the strip 41 is enclosed in a heat insulating shield 43. An arm 44 of a length $b$ is pivotally connected at its lower end at the point 45, to the upper end of element 41 and is linked to the element 40 by link 46 which is pivoted to the arm 44 at the point 47, which is at a distance $a$ from the point 45, and to an arm 48 carried by the element 40 at the point 49. The arm 44, at its upper end, carries movable contact 50 which moves between the stationary contacts 51 and 52. These three contacts may be connected to the three wires of a damper motor as shown in Figure 1. The elements 40 and 41 may, if desired, have the same sensitivity. They both tend to move in the same direction for an increase in temperature. If the temperature change takes place very slowly, the elements 40 and 41 will move together and there will be little, if any, differential motion between them and consequently, the displacement of the arm 44 will take place as if the arm 44 were rigidly mounted on the element 41. On the other hand, if a sudden temperature variation takes place, the bimetallic element 40 will quickly respond thereto while the bimetallic element 41 will have a lagged response due to the heat insulation. Consequently, the element 40 will operate through the link 46 to move the arm 44 a greater distance than would take place for the same temperature variation occurring slowly.

The points 47 and 49, where the link 46 is connected, may be shifted to vary the ratio $$\frac{b}{a}$$

and thus adjust the amount of over-compensation obtained for rapid temperature variations.

Figure 10:
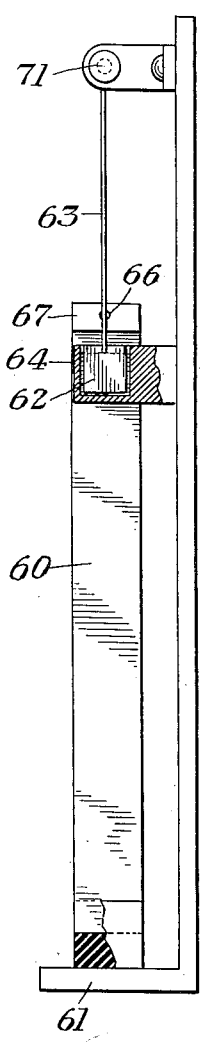

In Figures 9 and 10 there is illustrated still another form of thermostat which operates to give a greater response for rapid temperature variations than for slow temperature variations. This thermostat comprises a single bimetallic element 60 carried on a suitable base 61. The lagged element is replaced by a damping vane 62 carried by the lower end of the arm 63 and moving in a receptacle 64 containing a viscous liquid 65. In this construction the arm 63 is connected to the upper end of the element 60 by means of a short horizontal arm 66 mounted in a block 67 of insulating material carried by the upper end of the element 60. The arm 66 supports the arm 63 through a spring 68. The arm 63 carries a contact 69 movable between stationary contacts 70 and 71 which may control a damper operating motor by a three-wire circuit such as is shown in Figure 1.

The action of this form of thermostat is as follows: Due to the stiffness of the spring 68 the arm 63 normally remains at right angles to the arm 66. For slow temperature changes the motion of the end of the thermostat 60 is so slow that the drag of the viscous fluid on the vane 62 is negligible and the arms 63 and 66 move like a single rigid member. However, for rapid temperature variations the drag on the vane 62 becomes great enough to bend the spring 68, thus causing the upper end of the arm 63 to move more rapidly so that its displacement is increased with the rapidity of the temperature change.

The word "sensitivity" as used in the claims with reference to an element of a control mechanism means the property possessed by such an element of responding to changes in the condition to be controlled independently of means acting on such element affecting its time lag in response to such changes. With reference to an element of a thermostat, the word "sensitivity", as used in the claims, means the property of such an element of responding to changes in temperature independently of any insulating covering; that is, the response which the element would have if it were not insulated. The word "response" and its analogues, as used in the claims with reference to a control mechanism, means the effective relative movement of the elements of the control mechanism.

In certain of the claims, elements of the control mechanism are defined as being responsive, respectively, to present and past states of the condition to be controlled. The words "present" and "past" are used in a relative sense. There may be a slight lag in the response of the element defined as being responsive to the "present" state of the condition to be controlled, but there is nevertheless a clear distinction between the response of such element and that of one responsive to a "past" state of the condition, as in the latter case the response of the element is purposely delayed.

While the invention has been specially illustrated and described in connection with thermostatic control, it is to be understood that the invention might otherwise be embodied in other control systems such, for example, as pressure regulators, fluid flow regulators, speed governors, etc., in which two or more sensitive elements may be employed, one having a greater time lag than the other so as to cause a greater response or over compensation for rapid variations in the condition to be controlled than for slow variations. It is, therefore, to be understood that the present invention is not limited to its illustrated embodiment but may be otherwise embodied within the scope of the following claims.

I claim:

1. A thermostat comprising two sensitive thermo-responsive elements connected so that each tends to neutralize the effect of the other, the elements, however, having unequal effects in the operation of the thermostat for a given temperature change of whatever rapidity to which both elements may be subjected, whereby the thermostat responds to any variation in temperature whether rapid or slow, the element having the lesser effect being heat-insulated whereby its counteracting effect is less and the thermostat's response therefore greater for rapid than for slow variations in temperature to which the thermostat is subjected.

2. A thermostat comprising a sensitive thermo-responsive element and a second sensitive thermo-responsive element cooperating therewith and tending to neutralize the effect of the first element but having less sensitivity and greater time lag in its response to temperature variations.

3. A thermostat comprising a sensitive thermo-responsive element and a second thermo-responsive element cooperating therewith and tending to neutralize the effect of the first element, but having less sensitivity, the second element being heat-insulated so as to have a greater time lag in its response to the temperature variations to which the thermostat is subjected.

4. A thermostat comprising two thermo-responsive elements, the first of which is directly exposed to the temperature variations to which the thermostat is subjected and the second of which is heat-insulated so as to receive more slowly such temperature variations, the second element being connected to partially neutralize the effect of the first element whereby the thermostat is responsive to both rapid and slow temperature variations, but has greater response to rapid than to slow variations.

5. A thermostat comprising an element responsive to temperature variations and a second element cooperating with the first and having response of different magnitude than that of the first mentioned element for corresponding temperature variations of whatever rapidity to which the thermostat is subjected, the difference in magnitude between the response of the two elements being greater for rapid than for slow variations.

6. A control mechanism comprising a sensitive element responsive to the present state of the temperature condition to be controlled, a second sensitive element cooperating therewith and less responsive to the present state of the temperature condition, the response of the second element differing in magnitude from that of the first element for slow as well as for rapid variations in the condition, whereby the action of the control mechanism is determined by the rapidity of change of the condition.

7. The combination with a room to be heated, of a heat supplying means and a control means therefor, the effect of the heat supplying means on the room temperature lagging behind the action of its control means, and means for maintaining the temperature of the room substantially constant and counteracting such lag, comprising a thermostat subject to the temperature of the room and so connected to the control means as to maintain a substantially constant room temperature and comprising a thermo-responsive element, and means subject to room temperature cooperating with such element to cause the thermostat to act through the control mechanism to reduce or cut off the heat a longer time before the temperature for which the thermostat is set is reached for a rapid than for a slow increase in room temperature.

8. In a thermostat, a member having a relatively slow response to present temperature conditions and having a given amplitude of movement for an increment of temperature, and a second member cooperating therewith and having a relatively more rapid response to present temperature conditions and having a different amplitude of movement for such an increment of temperature.

In testimony whereof I have hereunto set my hand.

MAX MASON.